United States Patent [19]

Notomi et al.

[11] 3,962,184

[45] June 8, 1976

[54] PROCESS FOR PREPARING CURED RESIN FROM CYANIC ACID ESTERS USING IMIDAZOLE CATALYSTS

[75] Inventors: Toru Notomi; Morio Gaku; Kazuyuki Nakamichi; Kazuhiro Suzuki, all of Tokyo, Japan

[73] Assignee: Mitsubishi Gas Chemical Company, Inc., Tokyo, Japan

[22] Filed: Dec. 18, 1974

[21] Appl. No.: 533,746

[30] Foreign Application Priority Data

Dec. 21, 1973 Japan.............................. 48-143100

[52] U.S. Cl.............................. 260/47 CP; 260/49; 260/57 R; 260/57 A; 260/57 C; 260/77.5 R; 260/77.5 NC; 260/77.5 HC
[51] Int. Cl.².......................................... C08G 18/00
[58] Field of Search ............... 260/77.5 R, 77.5 NC, 260/49, 57 R, 57 A, 57 C, 77.5 AC, 47 CP

[56] References Cited

UNITED STATES PATENTS 3,502,617   3/1970   Schminke et al................... 260/858

*Primary Examiner*—M. J. Welsh
*Attorney, Agent, or Firm*—Wenderoth, Lind & Ponack

[57] ABSTRACT

A process for preparing a cured resin which comprises curing a specific cyanic acid ester or its prepolymer containing a triazine ring and having a molecular weight of 400 to 6,000 in the presence of a specific catalyst selected from imidazoles such as 2-methyl imidazole, 2-phenyl imidazole or 2-ethyl-4-methyl imidazole and imidazole adducts such as trimellitic acid adducts of the above exemplified imidazoles.

4 Claims, No Drawings

PROCESS FOR PREPARING CURED RESIN FROM CYANIC ACID ESTERS USING IMIDAZOLE CATALYSTS

FIELD OF THE INVENTION

This invention relates to a process for polymerizing cyanic acid esters and their prepolymers, and more specifically, to a catalyst for heat-curing cyanic acid esters and their prepolymers.

BACKGROUND OF THE INVENTION

A method has already been known to heat-curing a cyanic acid ester and/or its prepolymer using a catalyst to obtain a cured resin. This resin exhibits superior mechanical and electrical properties at room temperature and elevated temperatures, and can find various applications. For example, it is impregnated as a binder in a base material made of cellulosic fibers or glass fibers, and the impregnated base material is used as a laminated plate, or processed into press-formed articles. Moreover, this resin can be used as an insulating varnish for coils, or as molding materials.

In the conventional polymerization of cyanic acid esters and/or their prepolymers to form cured products, various acids, bases, salts and phosphorus compounds are used in combination as catalysts. A combination of a metal salt of an organic acid such as zinc octoate, catechol and triethylene diamine has been in frequent use as a suitable catalyst. However, triethylene diamine used as one ingredient of this catalyst has acute toxicity such as the irritation to the skin. Coupled with its sublimable nature, the toxicity gives rise to the disadvantage that triethylene diamine must be handled with care. Its strong hygroscopicity also presents handling difficulties. Moreover, a varnish prepared by blending the above catalyst with a cyanic acid ester and/or its prepolymer has poor storage stability. In other words, under pre-designed use conditions, triethylene diamine shortens the pot life of the varnish. Furthermore, when triethylene diamine is used, the rate of polymerization of the cyanic acid ester or its prepolymer is greatly affected by the temperature, and drastically changes according to even a slight change in temperature. It is extremely difficult therefore to adjust the B-stage of the curing of the varnish to the desired degree. The properties of the cured resin are neither satisfactory, for example, by showing a degradation in properties under a hygroscopic condition.

SUMMARY OF THE INVENTION

We have extensively made investigations about a new catalyst system which would be able to lead to the elimination of the above defects ascribable to the use of triethylene diamine as one ingredient of catalysts for polymerizing and curing cyanic acid esters and/or their prepolymers. Finally, we succeeded in providing a process for curing cyanic acid esters and/or prepolymers thereof which is free from the defects of the conventional techniques as a result of using a specific imidazole and its derivative as a curing catalyst.

Accordingly, the present invention provides a process for polymerizing and curing cyanic acid esters and/or their prepolymers using a specific imidazole as a catalyst.

DESCRIPTION OF THE INVENTION

In the present invention, a cyanic acid ester and/or its prepolymer is used as a starting material for producing a resin by curing. Accordingly, the cyanic acid ester and its prepolymer will sometimes be referred to in this application as "a resin precursor".

The cyanic acid ester that can be used as the resin precursor is a compound of the general formula

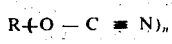

wherein R is an aromatic nucleus-containing residue which is selected from the group consisting of a residue derived from an aromatic hydrocarbon selected from the group consisting of benzene, biphenyl and naphthalene, a residue derived from a compound in which at least two benzene rings are bonded to each other by a bridging member selected from the group consisting of

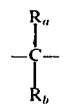

wherein $R_a$ and $R_b$ are the same or different and each represents a hydrogen atom or an alkyl group containing 1 to 4 carbon atoms,

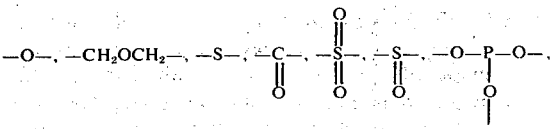

and

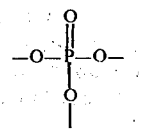

and a residue resulting from the removal of a phenolic hydroxyl group from a novolac type or resol-type phenolic resin skeleton; said aromatic nucleus is optionally substituted by a substituent selected from the group consisting of alkyl groups containing 1 to 4 carbon atoms, alkoxy groups containing 1 to 4 carbon atoms, chlorine and bromine; n is an integer of 2 to 5; and the cyanate group is always directly bonded to the aromatic nucleus.

The prepolymer of the cyanic acid ester which can be used as the resin precursor in this invention is a polymer containing a triazine ring which is prepared by the trimerization of the cyanate group of the cyanic acid ester, and has an average molecular weight of at least 400 but up to 6,000 at most. Such prepolymers are known per se, and can be prepared by polymerizing the above cyanic acid esters in the presence of, as a catalyst, an acid such as mineral acids or Lewis acids, a base such as sodium hydroxide, sodium alcoholate or a tertiary amine, a salt such as sodium carbonate or lithium chloride, or a phosphorus compound such as tributyl phosphine.

Examples of the cyanic acid esters that can be used in this invention are dicyanatobenzene, 4,4'-dicyanatobiphenyl, 1,5-dicyanato-naphthalene, bis(4-cyanotophenyl)methane, 2,2-bis(4-cyanatophenyl)-propane, 2,2-bis(3,5-dichloro-4-cyanatophenyl)-propane, 2,2-bis(3,5-dibromo-4-cyanatophenyl) propane, bis(4-cyanatophenyl)ether, bis(4-cyanotophenyl)thioether, bis(4-cyanatophenyl)sulfone, tris(4-cyanatophenyl)phosphite, and tris(4-cyanatophenyl)phosphate. There can also be used cyanic acid esters derived from phenolic resins having a structural unit of the formula

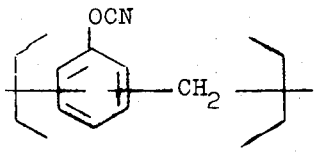

The imidazole used as a curing catalyst in the process of this invention is imidazole or its derivatives expressed by the following formula (I)

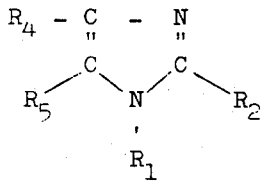

wherein $R_1$ is a hydrogen atom, an alkyl group containing 1 to 5 carbon atoms, a benzyl group, a cyanoalkyl group containing an alkyl group with 1 to 5 carbon atoms, an aminoalkyl group containing 1 to 5 carbon atoms or a guanaminoalkyl group containing an alkyl group with 1 to 2 carbon atoms, the above alkyl groups being of linear or branched chain; $R_2$ is a hydrogen atom, a linear or branched chain alkyl group containing 1 to 20 carbon atoms, a cyclohexyl group or a phenyl group; and $R_4$ and $R_5$, independently from each other, are a hydrogen atom or a linear or branched chain alkyl group containing 1 to 5 carbon atoms.

Imidazole adducts of the following formula (II)

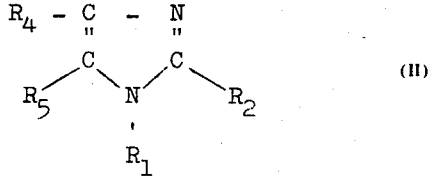

wherein $R_1$, $R_2$, $R_4$ and $R_5$ are the same as defined in formula (I), and $R_3$ represents an aromatic polycarboxylic acid, usually trimellitic acid, which forms an adduct by addition to the imidazole.

In the present application, the imidazole or its derivatives of formula (I) and the imidazole adducts of formula (II) will hereinafter be generically referred to as "an imidazole" or "imidazoles".

In the method of this invention, at least one of the above compounds is used as a curing catalyst. Examples of suitable imidazoles are 2-methyl imidazole, 2-iso-propyl imidazole, 2-undecyl imidazole, 2-heptadecyl imidazole, 2-phenyl imidazole, 2-ethyl-4-methyl imidazole, 1-benzyl-2-methyl imidazole, 1-propyl-2-methyl imidazole, 1-cyanoethyl-2-methyl imidazole, 1-cyanoethyl-2-ethyl-4-methyl imidazole, 1-cyanoethyl-2-undecyl imidazole, 1-cyanoethyl-2-phenyl imidazole, 1-aminopropyl-2-phenyl imidazole, 1-guanaminoethyl-2-methyl imidazole, and trimellitic acid adducts of these imidazoles.

According to the process of this invention using these imidazoles as a curing catalyst, the handling difficulties of the prior art can be overcome. Specifically, the imidazoles do not possess acute toxicity such as irritation to the skin, and because of having no sublimability and hygroscopicity, are easy to handle. Furthermore, with varnishes containing the imidazoles as a catalyst, the cyanic acid ester and/or its prepolymer is not degenerated, and the varnishes have good storage stability and a long pot life. The trimellitic acid-adducts of the imidazoles are especially effective for prolonging the pot life of the varnishes. Whilst the use of triethylene diamine results in a prolonged cure time with longer storing periods, the use of imidazoles in accordance with this invention brings about the advantage that the cure time is not affected by the storage period. Virtually, therefore, this results in the shortening of the cure time after storing the varnish for a long period of time, as compared with the use of triethylene diamine. In addition, since the temperature dependence of the catalytic effect is reduced in the process of this invention, it is extremely easy to control the polymerization and curing of the cyanic acid ester and/or its prepolymer. The final cured resins, too, have an elevated decomposition temperature and the freedom from deterioration of the properties under a hygroscopic condition.

The imidazoles can be used alone in the process of this invention, but if desired, together with other catalyst ingredients, for example, organic metal salts such as zinc octoate, tin octoate, tetrabutyl ester of titanic acid, zinc stearate, tin stearate or calcium stearate, phenolic compounds such as phenol or catechol, above all catechol, and triethylene diamine, either singly or in combination. The preferred amount of the additional catalyst ingredients is 0.001 to 1 part by weight for the organic metal salt, the phenolic compound, and triethylene diamine, respectively, all based on 100 parts by weight of the resin precursor of the present invention.

The amount of the imidazole used in the process of this invention can be varied according to the purpose of using the final cured product of the cyanic acid ester and/or its prepolymer. Moreover, it varies according to whether the resin precursor is a cyanic acid ester monomer, its prepolymer or a mixture of these, or whether the imidazole is used alone or in combination with additional ingredients. Accordingly, it is difficult to determine a specific limit to the amount of the imidazoles used. One criterion for determing the amount of the imidazoles in the process of this invention is to select it in such a way that the gel time which relates to the operability for producing the desired product is adjusted to the desired value. Generally, the imidazole is used in the process of this invention in an amount corresponding to at least about 0.005 part by weight per 100 parts by weight (as solids) of the cyanic acid ester and/or its prepolymer as the resin precursor. The exact amount may be determined by taking all the above factors into consideration. The upper limit of the amount is not particularly critical. Generally, where the final product is a shaped article, the imidazole is used in a larger amount than in the case of preparing an impregnating varnish for preparation of laminated plates. When the imidazoles are used alone, the amount will be larger than in the case of using a catalyst system consisting of the imidazoles and additional ingredients. Usually, it is preferred to adjust the amount of the imidazole to 0.005 to 20 parts by weight per 100 parts by weight of the cyanic acid ester and/or its prepolymer as the resin precursor.

In performing the process of this invention, the cyanic acid ester and its prepolymer may be converted to a cured resin in one step. Usually, however, it is desirable to employ a two-step procedure in which the resin presursor is first converted to a semi-cured resin in the B-stage, and then converted to a final cured resin. The operating conditions in the semi-curing step vary according to the amount of the catalyst used, but usually, are selected so that a semi-cured B-stage resin is obtained within 10 hours at a temperature of 80° to 120°C. The operating conditions in converting the B-stage resin into a final cured resin are usually so selected that the curing reaction will be completed in 1 minute to 3 hours at a temperature of 140° to 220°C.

The operating conditions in curing the resin precursor in one step may be so selected that a final cured resin will be obtained within 20 minutes to 20 hours at a temperature of 170° to 250°C.

The curing process in accordance with this invention can be applied not only to the cyanic acid ester and/or its prepolymer as a resin precursor, but also to a mixture of it with another thermosetting resin such as an epoxy resin, unsaturated polyester resin, phenolic resin or amino resin.

The following Examples illustrate the present invention.

EXAMPLE 1

Varnishes were prepared from a prepolymer derived from 2,2-bis(4-cyanatophenyl)propane as a resin precursor (KU-6573, a tradename for a product of Bayer AG which is a varnish prepared by using methyl ethyl ketone as a solvent to a solids content of 70% by weight and also containing the above-said monomer) and each of the curing catalysts indicated in Table 1 in accordance with the recipes shown in Table 1. Changes with time of the gel time of each of the varnishes were examined by storing them at a temperature of 25°C. and a relative humidity of 60%. The results are shown in Table 1.

Table 1

| | Types | Varnish I | Varnish II | Varnish III |
|---|---|---|---|---|
| | | (Amounts used in parts by weight) | | |
| Resin Precursor | KU-6573 | 100 (solids content) | | |
| Catalyst | Zinc octoate (8%Zn) | | 0.2 | |
| | Catechol | | 0.1 | |
| | 2-Ethyl-4-methyl imidazole | 0 | 0.075 | 0.04 |
| | Triethylene diamine | 0.02 | 0 | 0.01 |
| Gel time (seconds) at 160°C | Immediately after mixing | 192 | 201 | 209 |
| | 24 hours later | 215 | 205 | 211 |
| | 48 hours later | 235 | 210 | 211 |
| | 72 hours later | 246 | 213 | 213 |
| | 168 hours later | 265 | 218 | 215 |

As can be seen from Table 1, where the imidazole in accordance with this invention is not used, the gel time as a measure of the curability of the resin precursor with the passage of the storing time becomes longer. This means that in an operation of producing a cured product, there is a deviation from the pre-designed curing reaction conditions with longer periods of storing the varnish, and this deviation is undesirable for the standardization of the curing operation. On the other hand, when the imidazole is used in accordance with this invention, the storage stability of the varnish is excellent.

EXAMPLE 2

Zinc octoate (0.2 part by weight), 0.1 part by weight of catechol and 0.08 part by weight of 2-ethyl-4-methyl imidazole were mixed with 143 parts by weight of a varnish containing a prepolymer derived from 2,2-bis(4-cyanate phenyl)propane (same as that used in Example 1) to prepare an impregnating varnish (A). An impreganating varnish (B) was prepared in the same way as above except that 0.02 part by weight of triethylene diamine was used instead of 2-ethyl-4-methyl imidazole. These varnishes were designed so that they would have a gel time of about 200 seconds at 160°C.

A glass cloth was impregnated with each of the varnishes (A) and (B) and dried at 125° to 140°C. for 7 minutes in an attempt to prepare a prepreg having a gel time of about 100 seconds at 170°C. The impregnated resin became a B-stage resin. The relation between the drying temperature and the gel time of the resin in the prepreg is shown in Table 2.

Table 2

| Drying temperature (°C) | Gel time (seconds) of the resin in the prepreg | |
|---|---|---|
| | Varnish (A) | Varnish (B) |
| 125 | 121 | 132 |
| 130 | 103 | 106 |
| 135 | 95 | 49 |
| 140 | 75 | Gelled during drying of the prepreg |

With the varnish (B) containing triethylene diamine, the resin-impregnated glass cloth is required to be dried under very limited temperature conditions in order to prepare a prepreg having a gel time of 100 seconds at 170°C. In contrast, with the varnish (A) containing the imidazole in accordance with this invention, the allowable drying temperature is within a wide range, and a prepreg of glass cloth can be prepared easily and stably.

EXAMPLE 3

A prepreg was prepared by impregnating a glass cloth with the varnish used in Example 1. The prepreg was laminated on a copper foil with a thickness of 35μ, and the assembly was hot pressed at 180°C. for 2 hours and then at 190°C. for 2 hours to prepare a copper-clad laminate. The properties of the resulting laminate and shown in Table 3 (the testing methods in accordance with JIS C 6481).

Table 3

| Properties | | Unit | Varnish I | Varnish II | Varnish III |
|---|---|---|---|---|---|
| Copper foil peel off strength | | Kg/cm | 2.0 | 2.25 | 2.15 |
| Solder heat resistance (260°C) | | seconds | above 120 | above 120 | above 120 |
| Glass transition temperature | | °C | 280 | 290 | 290 |
| Water absorption (D-48/50) | | % | 0.08 | 0.07 | 0.07 |
| Dielectric constant (1 MHz) | | | 4.0 | 4.0 | 4.0 |
| Insulation resistance (D-2/100) | | Ω | $3 \times 10^{13}$ | $2 \times 10^{13}$ | $3 \times 10^{13}$ |
| Resistance to thermal shock* | | Hr | 1 | 5 | 4 |
| Heat decomposition temperature | In normal state | °C | 317 | 325 | 321 |
| | After treating in a boiling water | °C | 298 | 314 | 310 |

*The "resistance to thermal shock" was determined as follows: The laminate was treated in boiling water, and then dipped for 30 second in oil at 260°C. Then, the peel off between the laminate layers was examined. The result was shown by the boiling treatment time that passed until the peel off occurred.

It is seen from the results shown in Table 3 that by using the imidazole instead of triethylene diamine, the final cured resin have improved thermal properties such as in respect of glass transition temperature and heat decomposition temperature, and also there is an improvement in resistance to the deterioration of properties under hygroscopic condition as represented by its resistance to thermal shock and heat decomposition temperature.

EXAMPLE 4

100 Parts by weight (as solids content of resin) of the same prepolymer varnish derived from 2,2-bis(4-cyanatophenyl)propane as used in Example 1 were mixed with 0.2 part by weight of zinc octoate, 0.1 part by weight of catechol and each of the imidazoles or triethylene diamine shown in Table 4 in the amount indicated. Changes with period of the gel time of the resulting varnishes at 160°C. were examined. The results are shown in Table 4. Since the effect of an increase in the amount of the imidazoles on the gel time is caused only slowly, the gel time of the varnish can be easily adjusted, and the operability is good.

Table 4

| Amine component of catalyst Amount | 2-Ethyl-4-methyl imidazole | 2-Heptadecyl imidazole | Pyromellitic acid-adduct of 1-cyanoethyl imidazole | Triethylene diamine |
|---|---|---|---|---|
| (Parts by weight) | (seconds) | (seconds) | (seconds) | (seconds) |
| 0 | 420 | 420 | 420 | 420 |
| 0.02 | 358 | 380 | 413 | 192 |
| 0.04 | 297 | 348 | 388 | 160 |
| 0.06 | 235 | 322 | 359 | 132 |
| 0.08 | 195 | 309 | 331 | 121 |
| 0.10 | 190 | 301 | 306 | 105 |
| 0.20 | 154 | 194 | 221 | — |
| 0.50 | 54 | 73 | 92 | — |

EXAMPLE 5

2,2-bis(4-cyanatophenyl)propane was dissolved in methyl ethyl ketone to form a 60% by weight solution. 10 parts by weight, per 100 parts by weight of the above cyanate, of 2-ethyl-4-methyl imidazole was added to the solution. The gel time of the resulting varnish at 170°C. was measured, and found to be 153 seconds. When the catalyst was not added, the gel time was more than 700 seconds.

EXAMPLE 6

100 Parts by weight of a cyanic acid ester containing as a skeleton a novolac-type phenolic resin having a number average molecular weight of 600 were uniformly mixed with 0.35 part by weight of 2-methyl imidazole, and the gel time of the mixture at 160°C. was measured and found to be 65 seconds. When the 2-methyl imidazole catalyst was not used, the gel time was 340 seconds.

The above mixture was charged into a press-molding die, and molded for 3 minutes at 150°C. and 100 Kg/cm². The molded article was after-cured at 200°C. for 2 hours. The cured molded article had a glass transition temperature of 300°C.

What we claim is:

1. In the process for preparing a cured resin which comprises curing a resin precursor in the presence of a catalyst, wherein said resin precursor is at least one member selected from the group consisting of cyanic acid esters of the following formula

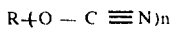

wherein R is an aromatic nucleus-containing residue which is selected from the group consisting of a residue derived from an aromatic hydrocarbon selected from the group consisting of benzene, biphenyl and naphthalene, a residue derived from a compound in which at least two benzene rings are bonded to each other by a bridging member selected from the group consisting of

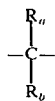

wherein $R_a$ and $R_b$ are the same or different and each represents a hydrogen atom or an alkyl group containing 1 to 4 carbon atoms,

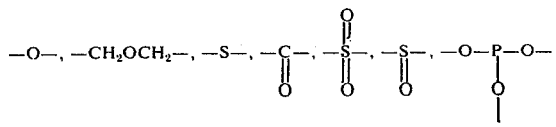

and

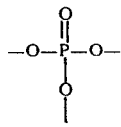

and a residue resulting from the removal of a phenolic hydroxyl group from a novolac-type or resol-type phenolic resin skeleton; said aromatic nucleus is optionally substituted by a substituent selected from the group consisting of alkyl groups containing 1 to 4 carbon atoms, alkoxy groups containing 1 to 4 carbon atoms, chlorine and bromine; $n$; is an integer of 2 to 5; and the cyanate group is always directly bonded to the aromatic nucleus, and prepolymers of the said cyanic acid esters which have a triazine ring and an average molecular weight of 400 to 6,000, and are formed by trimerizing the cyanate group of the cyanic acid esters, the improvement which is characterized in that as said curing catalyst is used at least one compound selected from the group consisting of imidazoles of the following formula (I)

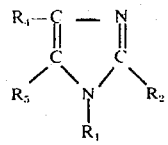

wherein $R_1$ is a hydrogen atom, an alkyl group containing 1 to 5 carbon atoms, a benzyl group, a cyanoalkyl group containing an alkyl group with 1 to 5 carbon atoms, an aminoalkyl group containing 1 to 5 carbon atoms or a guanaminoalkyl group containing an alkyl group with 1 to 2 carbon atoms, the above alkyl groups being of linear or branched chain; $R_2$ is a hydrogen atom, a linear or branched chain alkyl group containing 1 to 20 carbon atoms, a cyclohexyl group or a phenyl group; and $R_4$ and $R_5$, independently from each other, are a hydrogen atom or a linear or branched chain alkyl group containing 1 to 5 carbon atoms, and imidazole adducts of the following formula

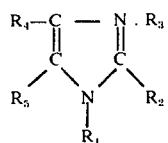

wherein $R_1$, $R_2$ $R_4$ and $R_5$ are the same as defined with regard to formula (I), and $R_3$ represents an aromatic polycarboxylic acid which forms an adduct by addition to the imidazole.

2. The process of claim 1 wherein the amount of said curing catalyst is at least 0.005 part by weight per 100 parts by weight of said resin precursor.

3. The process of claim 1 wherein said adduct is formed in combination with trimellitic acid.

4. The process of claim 1 wherein said curing catalyst is a mixture of said at least one imidazole compound and at least one member selected from the group consisting of organic metal salts, phenolic compounds and triethylene diamine.

* * * * *